United States Patent [19]
Karass et al.

[11] 3,750,801
[45] Aug. 7, 1973

[54] CONVEYING DEVICE

[75] Inventors: Hans-Joachim Karass, Dortmund-Berghofen; Heinz Kroger, Dortmund-Asseln, both of Germany

[73] Assignee: Holstein & Kappert Maschinenfabrik Phonix GmbH, Dortmund, Germany

[22] Filed: Sept. 13, 1971

[21] Appl. No.: 176,401

[30] Foreign Application Priority Data
May 23, 1971 Germany................. P 21 26 313.8

[52] U.S. Cl................. 198/43, 198/34 A, 198/104
[51] Int. Cl............................................. B65g 47/00
[58] Field of Search.................. 198/103, 22, 34 A, 198/25, 26, 102, 104, 43

[56] References Cited
UNITED STATES PATENTS

| 219,871 | 9/1879 | Olin | 198/25 |
| 2,837,127 | 6/1958 | Luther | 198/34 A |
| 3,124,231 | 3/1964 | Ott, Jr. | 198/103 |
| 2,643,759 | 6/1953 | Swanson | 198/103 |

*Primary Examiner*—Richard E. Aegerter
*Assistant Examiner*—Joseph E. Valenza
*Attorney*—Michael S. Striker

[57] ABSTRACT

A receiving station for articles which are to be conveyed in a horizontal orientation is located at an upper level, and a supplying station for these articles is located at a lower level. The supplying station comprises an element rotating about a horizontal axis provided in its periphery with equiangularly spaced article-receiving pockets each of which extends longitudinally of the axis of rotation. An article-feeding screw is located beneath the element extending normal to the horizontal axis and having a discharge end beneath the element for discharging articles into the respective pockets thereof. An endless belt-conveyor moves in vertical path between the supplying station and the receiving station and is provided with outwardly extending members spaced longitudinally from one another and inclined forwardly and upwardly in the direction of movement of the belt, so positioned as to each engage an article accommodated in one of the pockets and to lift it out and convey it to the receiving station.

8 Claims, 4 Drawing Figures

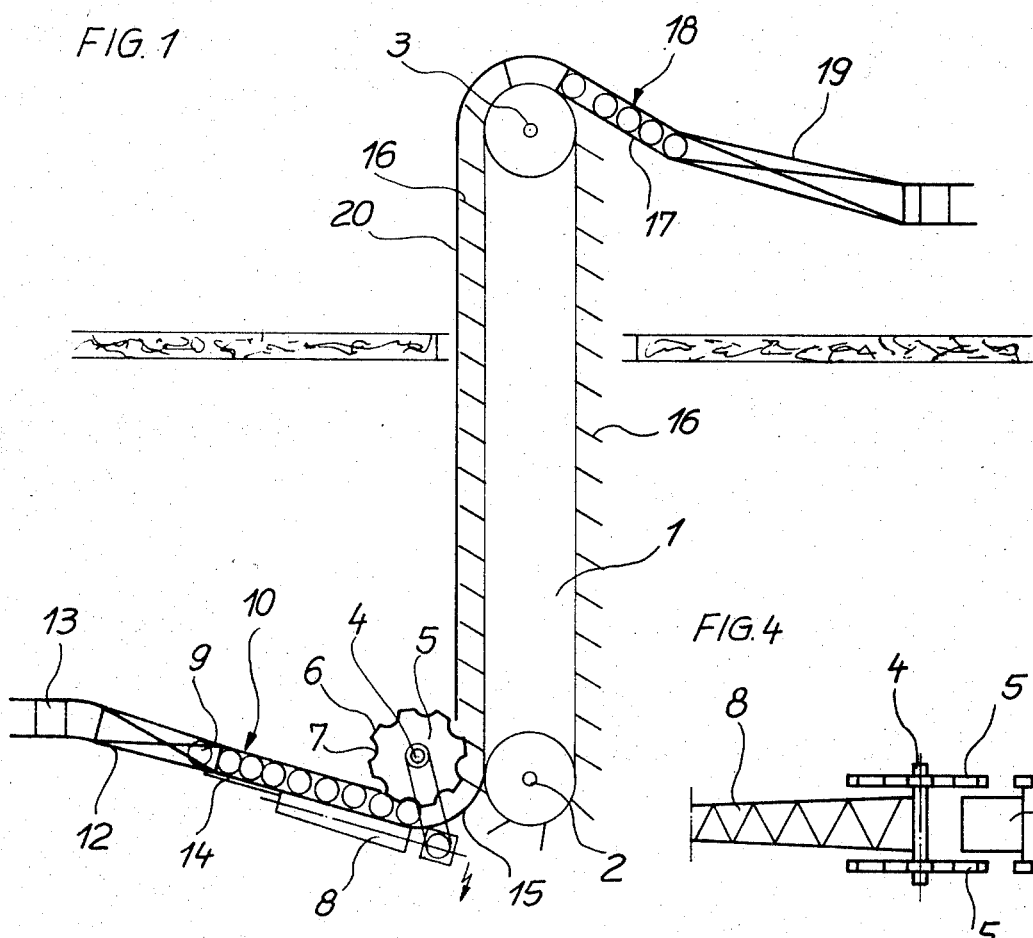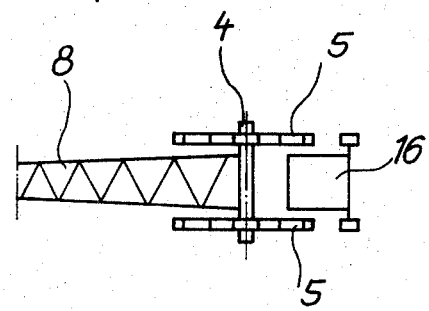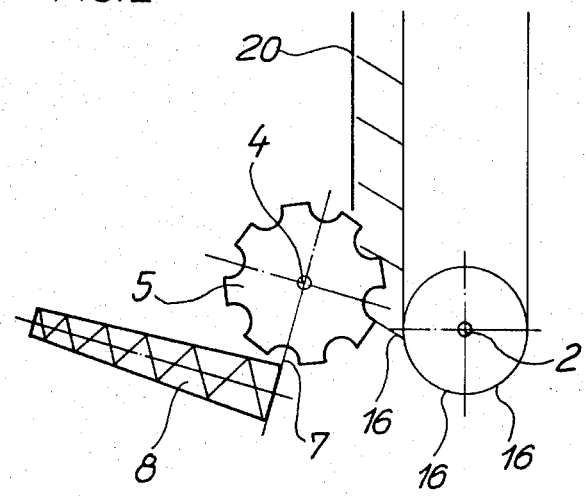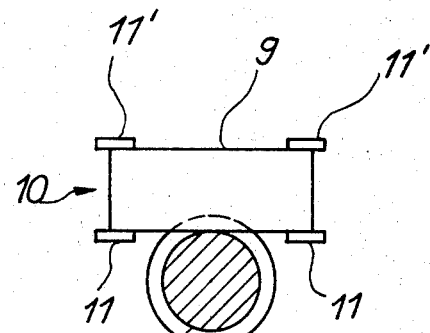

CONVEYING DEVICE

BACKGROUND OF THE INVENTION

The present invention relates generally to a conveying device, and more particularly to a continuously operating conveying device. Still more particularly, the invention relates to a continuously operating article-conveying device for conveying articles from a lower supplying station to a higher receiving station.

Conveying devices of this general type are already known. They receive the articles to be conveyed, such as cans, bottles, and the like, in vertical orientation from a conveyor belt. The vertical conveyor belt and the supply conveyor at its lower end extend tangentially with one another in one and the same vertical plane at the point where articles are transferred from the supply conveyor to the vertical conveyor. The same is true with respect to the upper end of the vertical conveyor and the removal conveyor. When articles are transmitted from the supply conveyor to the vertical conveyor they tilt onto the engaging portions of the vertical conveyor until they rest freely on these engaging portions in approximately horizontal orientation and are moved vertically, either upwardly or downwardly, by the vertical conveyor. The discharge from the vertical conveyor onto the removal conveyor takes place in the same manner but in reversed sequence.

Another type of conveyor for bridging height distances utilizes a conveyor of endless bands or analogous means which are provided with carriers spaced from one another at identical distances and extending at right angles to the vertical direction of movement of the conveyor. The carrying elements themselves are of substantially rake-shaped configuration and pass through a discharge platform which is of complementarily rake-shaped configuration and where they engage the respectively leading article to lift it off and convey it away.

It has been found that in these known devices of the prior art only a relatively small throughput of articles per unit of time can be achieved, because the articles themselves are not firmly guided during transmittal between the vertical conveyor and the supply or removal conveyor. This means that they are engaged and removed only freely and without proper guidance. In addition, the distances of the individual article-engaging members must be at least accommodated to the height of the articles to be transported. Because as a rule several types of articles, for instance several types of cans, bottles or the like—are to be transported with these devices, the distances must be chosen with a view towards the maximum height or length of articles to be transported, which of course results in a significant reduction in the number of operative article-engaging members and in a reduction of the throughput per unit of time.

SUMMARY OF THE INVENTION

It is, accordingly, a general object of the present invention to provide an improved conveying device of the type here under discussion.

More particularly it is an object of the present invention to provide such an improved conveying device which avoids the disadvantages of the prior art.

A concomitant object of the invention is to provide such an improved conveying device which affords a significant increase in the throughput per unit of time over what is known from the prior art, but is no more complicated or expensive than the prior-art arrangements.

In pursuance of the above objects, and of others which will become apparent hereinafter, one feature of the invention resides in a conveying device which, briefly stated, comprises a receiving station located at a first level for receiving conveyed articles, and a supplying station located at a second different level for supplying articles to be conveyed to the receiving station. The supplying station comprises a supplying element rotating about a horizontal axis and having a periphery provided with a plurality of equi-angularly spaced article-receiving pockets each extending longitudinally of the aforementioned axis, and an article-feeding screw extending normal to the horizontal axis and having a discharge end beneath the supplying element for discharging articles into the respective pockets. There is further provided conveying means for conveying articles from the supplying station to the receiving station, and this comprises an endless conveying element travelling between the stations, and a plurality of article-engaging members carried by the conveying element and each operative for engaging and lifting an article out of one of the pockets.

In this construction, in which the articles to be conveyed are moved to a horizontal orientation before they are transferred to the conveying means, the elongation of the articles during transfer is horizontal and in this orientation the articles can be supplied to the distributing or feeding screw which supplies each article gently into one of the pockets of the supplying element. Further, the article-engaging members can be located closely adjacent one another, whereby a substantial increase in the throughput of the device per unit of time is achieved because unproductive "dead" space between consecutive ones of the article-engaging members is reduced to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side-elevational view illustrating an embodiment of the invention;

FIG. 2 is a fragmentary enlarged detail view of FIG. 1;

FIG. 3 is a diagrammatic cross-section through a detail of FIG. 2; and

FIG. 4 is a diagrammatic top-plan view of the supplying element of FIGS. 1-3.

DESCRIPTION OF THE PREFERRED EMBODIMENTS

Discussing the drawing now in detail, it will be seen that all components or elements not essential for an understanding of the invention have been omitted for the sake of clarity. With this in mind it is pointed out that reference numeral 1 identifies a conveying element which is endless and travels between a lower supplying station and an upper receiving station. In the illustrated embodiment the conveying element 1 is shown by way of example to be an endless belt which is trained for rotation about two horizontal axes 2 and 3 located at different levels, for instance on different floors of a building structure or the like.

Located at the supplying station and rotating about a horizontal axis 4 which is located at a slightly higher level than the horizontal axis 2, is a supplying element 5 the periphery of which is provided with a plurality of equi-angularly spaced pockets 7 which are elongated in the longitudinal direction of the axis 4. Each of the pockets 7 is adapted to accommodate one of the articles 9 to be conveyed, and the element 5 may for instance be composed of two coaxial substantially disk-shaped star-profiled portions which are axially spaced from one another by a distance which is smaller than the minimum length of articles 9 to be conveyed.

Located beneath the element 5 is the terminal end of a feeding screw 8 of known construction whose longitudinal axis extends normal to the axis 4 and which may for instance be downwardly inclined. The feeding screw 8 distributes the articles 9, which hereafter shall be assumed to be cans, with equal spacing to the element 5. The screw 8 receives the articles 9 which roll to it under the influence of gravity along a downwardly inclined channel 10 which is composed of guide bars 11 and 11' as shown in FIG. 3 of relatively narrow configuration. The supporting planes of the bars 11 are located approximately at the same level as the core diameter of the screw 8 as shown in FIG. 3 also. The currently preferred configuration of the element 5 in form of two star-shaped disk portions is shown by way of example in FIG. 4. The articles 9 are supplied from a suitable location and in suitable via a channel 13 and enter into a device 12 whose construction is known per se and which moves them from the upright or vertical orientation, in which they arrive from the channel 13, to the horizontal orientation in which they are supplied to the channel 10.

After reaching the channel 10 in horizontal position in which they can now roll along channel 10, the cans 9 enter into a back-up zone 14 in which each successive can 9 presses under the influence of gravity against the respectively preceding can 9. This supplies the necessary inserting pressure required for inserting the articles into the feeding screw 8. The articles 9 are engaged seriatim by the screw 8 and are supplied at necessary spacing into the successive pockets 7 of the element 5. Once engaged in the pockets 7 the cans roll along an arcuate path in engagement with a curved support structure 15 which extends close to the conveying element 1.

As FIGS. 1 and 2 show particularly clearly, the element 1 is provided with a plurality of article-engaging members 16 which project at identical distances outwardly from the element 1 and which are inclined forwardly in the direction of advancement of the latter, that is in clockwise direction. They are so synchronized with the movement of the pockets 7 that each member 16 moves beneath an article 9 accommodated in a respective pocket 7 as the respective member 16 passes around the lower axis 2 in clockwise direction, engaging the article 9 in the respective pocket and lifting it during further straight-line upward movement of the member 16. The article 9 is now raised to the desired height and, after moving around the upper axis 3, it is supplied without any further manipulative steps and without requiring any further devices to the lower supporting bars 17 of a removal conveyor 18 or channel 18. The latter is then followed by a further device 19, similar to the device 12, which moves the articles 9 from horizontal to upright orientation so that they can be supplied in this orientation to further apparatus or locations.

The members 16 may be of rake-shaped or comb-shaped configuration, but they may also be of plate-like shape. In either case they will be provided with cut-outs or recesses corresponding with the terminal portion of the support means 15 and the bars 17, so that these terminal portions will pass through these cut-outs as the members 16 move with reference to the terminal portions. Of course, the terminal portions may also define recesses between themselves with the article-engaging members 16 moving through such recesses. A guide 20 may be provided to facilitate proper transmittal of the articles and a lower portion of this guide may extend into the space between the disk portions of the element 5 so as to deflect the articles 9 into the spaces between successive members 16 once they are engaged and lifted out of the respective pockets 7.

FIG. 2 shows particularly clearly that in the illustrated embodiment the horizontal axis 4 about which the element 5 rotates is located at a slightly higher level than the horizontal axis 2 about which the element 1 is made to pass, so that when the periphery of the element 5 is intersected by the path in which the free ends of the members 16 travel, such intersection will take place slightly below the periphery of articles accommodated in the respective pockets 7. When a member 16 which has thus engaged an article 9 in a pocket 7 then moves into its upward straight-line portion of its path of travel, it moves ahead with respect to the movement of the pocket 7 in which it has engaged the article, so that the article is engaged from below and properly supported, and lifted out of the pocket 7. Any articles which might become skew or clamped as a result thereof, are forcibly deflected into the space between two associated members 16 by the stationary element 20 during further rotation of the element 5.

It will be understood that each of the elements described above, or two or more together, may also find a useful application in other types of constructions differing from the types described above.

While the invention has been illustrated and described as embodied in a conveying device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. A conveying device for elongated articles having horizontal orientation, comprising a receiving station located at a first level for receiving conveyed articles; a supplying station located at a second different level for supplying articles to be conveyed to said receiving station, said supplying station comprising a supplying element rotating about a horizontal axis and having a periphery provided with a plurality of equi-angularly spaced horizontally elongated article-receiving pockets each extending longitudinally of said axis, and article feeding means for feeding the articles to be conveyed, including a downwardly inclined chute extending to the vicinity of said supplying element and on which articles to be conveyed slide along, and a feeding screw extending at least substantially normal to said horizontal axis arranged to receive the articles from said chute and having a discharge end beneath said supplying element for discharging a single elongated article into each successive pocket; and conveying means for conveying articles from said supplying station to said receiving station, comprising an endless conveying element travelling between said stations, and a plurality of article-engaging members carried by said conveying element and each operative for engaging and lifting an article out of one of said pockets.

2. A conveying device as defined in claim 1, wherein said conveying means comprises an endless conveyor belt.

3. A conveying device as defined in claim 1, wherein said supplying element comprises a pair of star-shaped coaxial disk portions mounted for joint rotation and spaced axially from one another by a distance smaller than the minimum elongation of articles to be conveyed.

4. A conveying device as defined in claim 1, said article-engaging members having outer free ends remote from said conveying means; and further comprising support means adjacent said supplying station and conveying means at least in the region of said supplying element for supporting articles during transfer thereof from said supplying element to said article-engaging members and having recesses for passage of the outer free ends thereof.

5. A conveying device as defined in claim 1, said article-engaging members having outer free ends remote from said conveying means; and further comprising support means composed of a plurality of narrow support bars extending to the proximity of said conveying means beneath said supplying element and into the path of said outer free ends; and cut-outs provided in said outer free ends adapted to register with said support bars during movement of said outer free ends relative to the same.

6. A conveying device as defined in claim 1, said conveying means travelling in an upright path; and wherein said article-engaging members are inclined with reference to the elongation of said path forwardly in direction of the travel of said conveying means and have outer free ends which extend into the respective pockets during each travel.

7. A conveying device as defined in claim 6, wherein said endless conveying means rotates about an upper and a lower horizontal axis of rotation and wherein said lower horizontal axis of rotation is located at a level below said horizontal axis of said supplying element.

8. A conveying device as defined in claim 7, wherein said outer free ends travel in a path which intersects with the path traversed by the periphery of said supplying element, and wherein each outer free end engages beneath an article accommodated in a respective one of said pockets and lifts such article out of the pocket.

* * * * *